(12) United States Patent
Kasztenny et al.

(10) Patent No.: US 7,253,634 B1
(45) Date of Patent: Aug. 7, 2007

(54) GENERATOR PROTECTION METHODS AND SYSTEMS SELF-TUNING TO A PLURALITY OF CHARACTERISTICS OF A MACHINE

(75) Inventors: Bogdan Zdzislaw Kasztenny, Markham (CA); Dale Stephen Finney, Oshawa (CA); Michael Graham McClure, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/395,568

(22) Filed: Mar. 31, 2006

(51) Int. Cl.
*G01R 31/34* (2006.01)
*H02H 7/06* (2006.01)

(52) U.S. Cl. .................. 324/510; 324/772; 324/509; 324/623; 361/20

(58) Field of Classification Search ............ 324/510, 324/545, 620, 623; 361/20
See application file for complete search history.

(56) References Cited

U.S. PATENT DOCUMENTS

| | | | |
|---|---|---|---|
| 5,252,915 A | | 10/1993 | Sedding et al. |
| 5,602,709 A | * | 2/1997 | Al-Dabbagh ............... 361/85 |
| 5,764,462 A | * | 6/1998 | Tanaka et al. ............. 361/42 |
| 6,654,216 B2 | * | 11/2003 | Horvath et al. ............ 361/65 |
| 6,940,702 B2 | | 9/2005 | Kojovic et al. |
| 2004/0264079 A1 | * | 12/2004 | Lindahl et al. ............. 361/42 |

* cited by examiner

*Primary Examiner*—Andrew H. Hirshfeld
*Assistant Examiner*—John Zhu
(74) *Attorney, Agent, or Firm*—Rodney M. Young; Armstrong Teasdale LLP (57) ABSTRACT

A method for detecting stator ground faults in a generator is described. The method includes receiving a neutral voltage signal from a neutral point of a stator, receiving a plurality of terminal voltage and current signals from the stator, deriving a magnitude of a harmonic component from the neutral voltage signal, deriving a total complex power from the terminal voltage and current signals, calculating an expected value of a harmonic based on the complex power at a first time and a plurality of values of the complex power, where the values of the complex power are measured at times before the first time, and comparing the expected value and a measured value of the harmonic.

16 Claims, 5 Drawing Sheets

GENERATOR PROTECTION METHODS AND SYSTEMS SELF-TUNING TO A PLURALITY OF CHARACTERISTICS OF A MACHINE

BACKGROUND OF THE INVENTION

The present invention generally relates to monitoring, diagnostics and predictive maintenance of an electric power generator, and more particularly, to short-circuit protection of the generator.

A generator is equipped with protective relays that constantly monitor a status of the generator, a prime mover of the generator, and of an electric power system providing power to the generator. The protective relays respond automatically to abnormal conditions that could jeopardize the generator, the prime mover, or alternatively the power system.

A fault, such as a short-circuit, internal to the generator is an important subset of the abnormal generator conditions. If left in place, the short-circuit leads to a rapidly escalating damage of the generator in terms of thermal, mechanical and electrical destruction or degradation of a plurality of windings of the generator, an isolation of the generator, and an iron core of the generator. The longer the fault, the more extensive a damage to the generator, the longer the subsequent repair time and higher a repair cost. The damage may quadruple when the fault time is doubled, leading to a point of damage beyond repairs. Preventing the damage or reducing further damage to the generator calls on a generator protection system to decouple the power system from the generator as fast as possible in case of the fault. An expected reaction time is a range of milliseconds for high current faults, to seconds for less intrusive faults such as a first stator ground fault.

Operating principles of the protective relays follow general industry standards with proprietary enhancements aimed at achieving better performance, such as, faster and more sensitive detection of the abnormal conditions, corrective actions to mitigate an impact on the power system, and to limit the damage to the generator. Normally, a corrective action is to open a circuit breaker to isolate the power system from the generator. Opening the circuit breaker connecting the generator to the power system removes an external source of energy that feeds the fault. This traditional protection action including tripping is not sufficient in the case of the generator, as the generator itself is a source of energy. As a result, other actions may be initiated in order to accelerate the shut down of the power generation process. In any case, the generator is tripped offline and a number of supporting processes related to converting fuel into electricity are interrupted in an emergency mode.

False-positives, which include operating of the protective relays when not necessary, generate significant costs associated with a shut down of the generator. Failure to operate, which is a lack or alternatively a delayed operation of the protective relays, generates losses associated with greater damage to the generator and other equipment. The failure to operate also results in longer repair times, lost revenue during the repair time, or lost equipment if the damage is beyond repair.

Failure modes of the generator include a stator ground fault and an inter-turn fault in split-phase windings of the generator. Both these failures are difficult to detect by the protective relays. The stator ground fault is a short-circuit between any of a plurality of windings of a stator of the generator and ground, via the iron core of the stator. The generator may be interfaced with the power system via a delta-connected step-up transformer and works with a neutral point of the generator ungrounded or alternatively grounded via a relatively large resistance. As a result, an amount of a short-circuit current during a stator ground fault is driven by an amount of capacitive coupling in the generator and the step-up transformer. Therefore, when the stator ground fault occurs, very small capacitive current flows making the short-circuit difficult to detect. No or very little damage is done to the generator as a result of a first stator ground fault. If however, with the first stator ground fault in place, a second stator ground fault happens, high currents start to flow, leading to quickly escalating event and potentially catastrophic damage to the generator.

The generator may be built with multiple parallel windings in each phase of the stator of the generator. The parallel windings, by the nature of their internal arrangement, are more prone to the inter-turn fault. Due to effectively very high turn-ratio between the parallel windings and a plurality of shorted coils, the inter-turn fault causes extremely high currents in a faulted loop leading to a quickly progressing damage. At the same time, there are none, or very little symptoms of the inter-turn fault measurable in a plurality of signals outside of the generator. Typically, the inter-turn fault remains in place until the inter-turn fault evolves into much larger events that cause enough change in a plurality of signals monitored by the protective relays.

Known stator ground fault detection methods fall into two categories: active and passive methods. The active methods apply a source that generates a low-frequency low-energy square-wave signal. The square-wave signal is injected into the stator of the generator via an appropriately designed coupling circuit. If there is a lack of stator ground fault including a low-resistance connection between the stator and ground, a capacitive current is caused by the square-wave signal. If the stator-ground fault exists, a larger resistive current flows. The active methods are based on detecting a presence or alternatively an absence of the resistive current while using the source to constantly probe the generator. The active methods use extra circuitry including a special interfacing circuitry that needs to be properly isolated, the source, and a current detector. The extra circuitry increases a cost of installation, engineering and maintenance; and calls for extra space to install.

The passive methods monitor signatures in a plurality of available signals and use the difference in these signatures to detect ground faults. A third harmonic neutral voltage is a commonly used passive method. Without a low-resistance path to ground or no stator ground fault, the generator generates a non-zero third harmonic in the so-called neutral point voltage, which is a voltage measured at the neutral point of the generator. With a ground fault, the amount of the third harmonic voltage drops allowing for the detection.

Split-phase protection methods are based on monitoring the split-phase current—a difference between currents in the two parallel windings. This difference signifies a "circulating current" within the parallel windings. In order to provide for the required sensitivity of protection, the difference in currents in measured via window-type current transformer, rather than by paralleling two regular transformers, or other known method. Ideally, with no inter-turn short circuit present such split-phase current should be zero. In practice a non-zero values are measured because of slightly different placement of the two windings within the magnetic circuit of the stator, possible past repairs on the windings (removed coils), asymmetrical coupling with other phases of the machine, etc. Moreover, the amount of the natural split-phase current depends on the operating points of the machine and may change under normal conditions by more than during inter-turn faults. Traditional approach is to monitor the split-phase current and recognize an increased value, or a sudden change in the split-phase current as a sign of inter-turn fault. Finite ability to distinguish natural changes in the split-phase current from changes caused by faults is a major limitation of this traditional approach.

BRIEF DESCRIPTION OF THE INVENTION

In one aspect, a method for detecting stator ground faults in a generator is described. The method includes receiving a neutral voltage signal from a neutral point of a stator, receiving a plurality of terminal voltage and current signals from the stator, deriving a magnitude of a harmonic component from the neutral voltage signal, deriving a total complex power from the terminal voltage and current signals, calculating an expected value of the harmonic based on the complex power at a first time and a plurality of values of the complex power, where the values of the complex power are measured at times before the first time, and comparing the expected value and a measured value of the harmonic.

In another aspect, a method for detecting winding faults in a generator with parallel windings is described. The method includes receiving a split-phase current signifying a difference between currents in the parallel windings, receiving a plurality of terminal voltage and current signals from a stator of the generator, deriving at least one of a magnitude and a phase of the split-phase current, deriving a total complex power from the terminal voltage and current signals, calculating an expected value of the split-phase current based on the complex power at a first time and a plurality of values of the complex power, where the values of the complex power are measured at times before the first time, and comparing the expected value with a measured value of the split-phase current.

In yet another aspect, a system for detecting stator ground faults in a generator is described. The system includes a microprocessor-based relay. The microprocessor-based relay is configured to receive a neutral voltage signal from a neutral point of a stator, receive a plurality of terminal voltage and current signals from the stator, derive a magnitude of a harmonic component from the neutral voltage signal, derive a total complex power from the terminal voltage and current signals, calculate an expected value of the harmonic based on the complex power at a first time and a plurality of values of the complex power, where the values of the complex power are measured at times before the first time, and compare the expected value and a measured value of the harmonic.

In still another aspect, a system for detecting winding faults in a generator with parallel windings is described. The system includes a microprocessor-based relay. The microprocessor-based relay is configured to receive a split-phase current signifying a difference between currents in the parallel windings, receive a plurality of terminal voltage and current signals from a stator of the generator, derive at least one of a magnitude and a phase of the split-phase current, derive a total complex power from the terminal voltage and current signals, calculate an expected value of the split-phase current based on the complex power at a first time and a plurality of values of the complex power, where the values of the complex power are measured at times before the first time, and compare the expected value with a measured value of the split-phase current.

DETAILED DESCRIPTION OF THE INVENTION

The systems and methods for determining an occurrence of a short-circuit represent a magnitude of a harmonic in a two-dimensional plane of an active power and a reactive power output by a generator. Good accuracy in modeling an expected harmonic is achieved by using an active and reactive power of the generator. For a given combination of active and reactive power, normal changes in all other operating points of the generator have no or minimum impact on an amount of a harmonic.

First, the method for determining an occurrence of a short-circuit self-tunes to the generator by generating a weighted average of a plurality of harmonic values for a given active and reactive power point. With passing of time, as the generator is run at various active and reactive power values, more and more active and reactive power points are recognized by the method for determining an occurrence of a short-circuit. For each point, an expected harmonic is found. When the method for determining an occurrence of a short-circuit determines a given active and reactive power point for long enough, and after performing some extra security checks, a point is labeled as self-tuned or valid, and is used for detection of a stator ground fault if the stator ground fault happens at the particular value of the active and reactive power. After some time, all possible active and reactive power points are exercised yielding a complete surface representing an expected harmonic as a function of active and reactive power.

Second, the method for determining an occurrence of a short-circuit monitors a difference between a measured harmonic at any given time and an expected harmonic value. Measurements lower than an expected value with differences greater than an error, point to a stator ground fault, and are used to alarm and/or trip the generator off-line.

Third, a self-tuning process is in place all the time. As a result, the method for determining an occurrence of a short-circuit tracks slow drifts in a harmonic of the generator. This allows the method for determining an occurrence of a short-circuit to maintain an optimum performance regardless of slow natural changes, such as, changes due to temperature, humidity, seasonal, and other differences. However, the method for determining an occurrence of a ground fault monitors changes of a harmonic over longer periods of time, and alarms if significant departures occur. These changes can indicate stator ground fault detected but ignored by a user, or a deterioration in an isolation between a plurality of coils of a stator of the generator, or other problems with the generator.

The methods for determining an occurrence of a short-circuit determine that a variability in a magnitude and an angle of a split-phase current can be accurately modeled using an active and reactive power output from the generator. In a process of self-tuning, an expected magnitude and phase of a split-phase current are found for each of three-phases of the stator. After a given active and reactive power region is self-tuned, the information is used for protection purposes—a sudden departure in either magnitude or angle, in either direction signifies an inter-turn fault.

Figure 1:
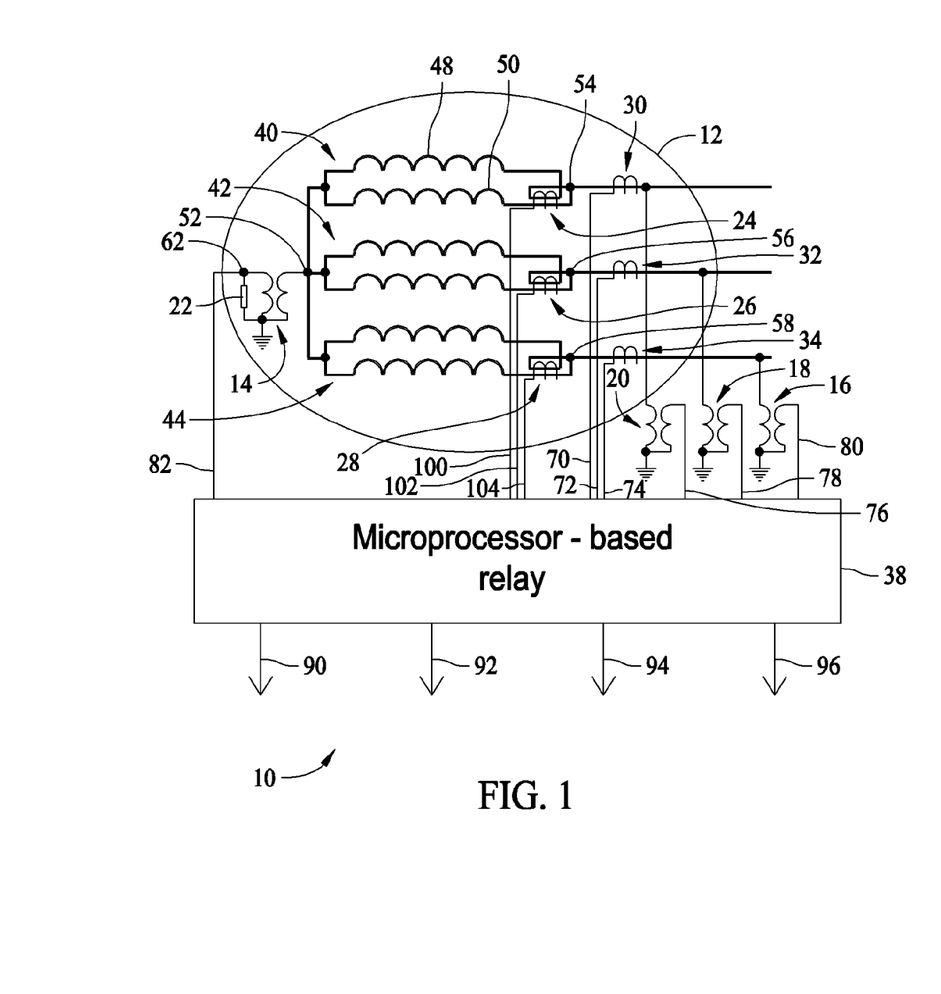
FIG. 1 is a block diagram of an embodiment of a system for determining an occurrence of a short circuit.

FIG. 1 is a block diagram of an embodiment of a system 10 for determining an occurrence of a short circuit. System 10 includes a stator 12 of the generator, such as a hydro generator, that generates electricity, a plurality of voltage instrument transformers 14, 16, 18, and 20, possibly a grounding device 22, such as a resistor, a plurality of current instrument transformers 24, 26, 28, 30, 32, and 34, and a microprocessor-based relay 38. Stator 12 includes a plurality of parallel circuits 40, 42, and 44. Each of parallel circuits 40, 42, and 44 include a plurality, such as from and including two to eight, of coils in parallel with each other. For example, parallel circuit 40 includes a plurality of coils 48 and 50 that are parallel with each other. Parallel circuit 40 includes a first phase of stator 12, parallel circuit 42 includes a second phase of stator 12, and parallel circuit 44 includes a third phase of stator 12. Parallel circuit 40 is coupled between a terminal 52 and terminal 54, parallel circuit 42 is coupled between terminal 52 and a terminal 56, and parallel circuit 42 is coupled between terminal 52 and a terminal 58. An example of each of voltage instrument transformers 14, 16, 18, and 20 includes a window-type current transformer. In an alternative embodiment, one of a computer, a processor, a microcontroller, a microcomputer, a programmable logic controller, and an application specific integrated circuit is used instead of microprocessor-based relay 38.

Microprocessor-based relay 38 uses current signals or currents output on a plurality of conductors 70, 72, and 74 of stator 12, and voltage signals or voltages output across conductors 76, 78, and 80 coupled to stator 12 to measure an active or real power, represented by P, and reactive power, represented by Q, output by the generator. Microprocessor-based relay 38 samples the voltages across conductors 76, 78, and 80 and currents on conductors 70, 72, and 74, and calculates, through digital signal processing, an active and reactive power output by the generator. In an alternative embodiment, an external sensor or transducer or a separate device can be used to provide the measurement of active and reactive power.

Voltage instrument transformer 14 converts a voltage generated at a terminal 62 to a voltage compatible with microprocessor-based relay 38. For example, voltage instrument transformer 14 steps down a voltage generated at terminal 52. Microprocessor-based relay 38 extracts a magnitude of an nth harmonic signal or an nth harmonic from a voltage at terminal 62 across a conductor 82, where n is an integer, such as a multiple of three. For example, microprocessor-based relay 38 samples a voltage at terminal 62, filters the voltage to remove harmonics other than an nth harmonic, converts the nth harmonic from a time domain into a frequency domain, and calculates a magnitude of the nth harmonic. In an alternative embodiment, a stand-alone sensor extracts a magnitude of an nth harmonic from a voltage across terminal 62.

Current instrument transformer 24 senses a difference between current within coils 48 and 50 to output a split-phase current signal or a split-phase current on a conductor 100 for the first phase. As used herein, a difference includes a vectorial difference. Current instrument transformer 26 senses a difference between current within coils of the second phase to output a split-phase current on a conductor 102 for the second phase. Current instrument transformer 28 senses a difference between current within coils of the third phase to output a split-phase current on a conductor 104 for the third phase. Microprocessor-based relay 38 receives split-phase currents sensed by current instrument transformers 24, 26, and 28 via conductors 100, 102, and 104. Microprocessor-based relay 38 applies a method for determining an occurrence of a stator ground or alternatively inter-turn short-circuit to output at least one of an alarm signal 90, a trip signal 92, an alarm signal 94, and a trip signal 96. Alarm signals 90 and 94 are output to generate an alarm by various procedures, such as, generating a display indicating the alarm on a display monitor. Trip signals 92 and 96 operate a circuit breaker between the energy source and stator 12 to disconnect the energy source from stator 12.

Figure 2:
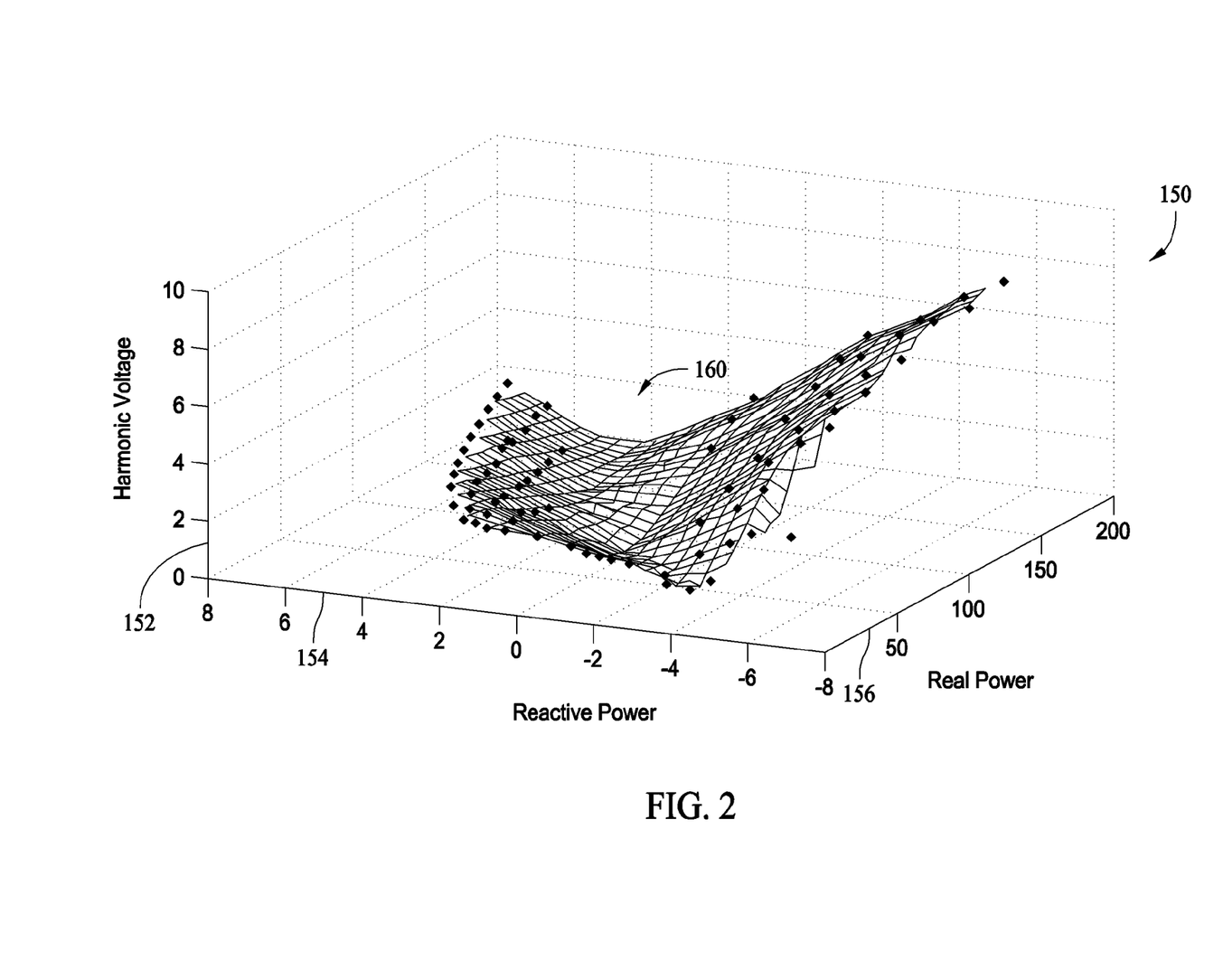
FIG. 2 is a graph representing a method executed by the system of FIG. 1.

FIG. 2 is a graph 150 representing a relationship between a magnitude of an expected value of an nth harmonic or an expected nth harmonic, an active power P, and a reactive power Q. Microprocessor-based relay 38 generates graph 150. A magnitude of an expected nth harmonic is represented along an axis 152, reactive power is represented along an axis 154, and real power is represented along an axis 156.

Graph 150 represents a relation between a magnitude of an nth harmonic, an active power P, and a reactive power Q in a two-dimensional plane. Graph 150 is a sample produced using a made-to-scale physical generator model. Graph 150 shows that that variables including active power P and reactive power Q are sufficient to represent a variability in an nth harmonic. For a given active and a reactive power point (P,Q), all other dimensions, such as frequency and temperature, of the generator have a limited impact on an amount of an nth harmonic as long as the other dimensions are within their normal range. At each (P,Q) point, microprocessor-based relay 38 issues at least one of alarm signal 90 and trip signal 92 if a magnitude of a measured value of an nth harmonic or a measured nth harmonic measured at a given time is lower, by some security margin, compared with a magnitude of an expected nth harmonic, which is a function of an active power P and a reactive power Q at a given time.

A surface 160 defining a magnitude of an expected nth harmonic in response to an active power P and a reactive power Q is identified in the self-tuning of the method for determining an occurrence of a short-circuit. Under normal no-fault conditions, microprocessor-based relay 38 observes an operating point, such as a magnitude of an nth harmonic, an active power P, and a reactive power Q, of stator 12, processes, such as generates an average, of an nth harmonic for each (P,Q) point. Microprocessor-based relay 38 receives a plurality of magnitudes of an nth harmonic for extended period of time, processes, such as generates a weighted average, of the magnitudes, and checks the processed magnitude against some security conditions to determine an expected or normal magnitude.

Figure 3:
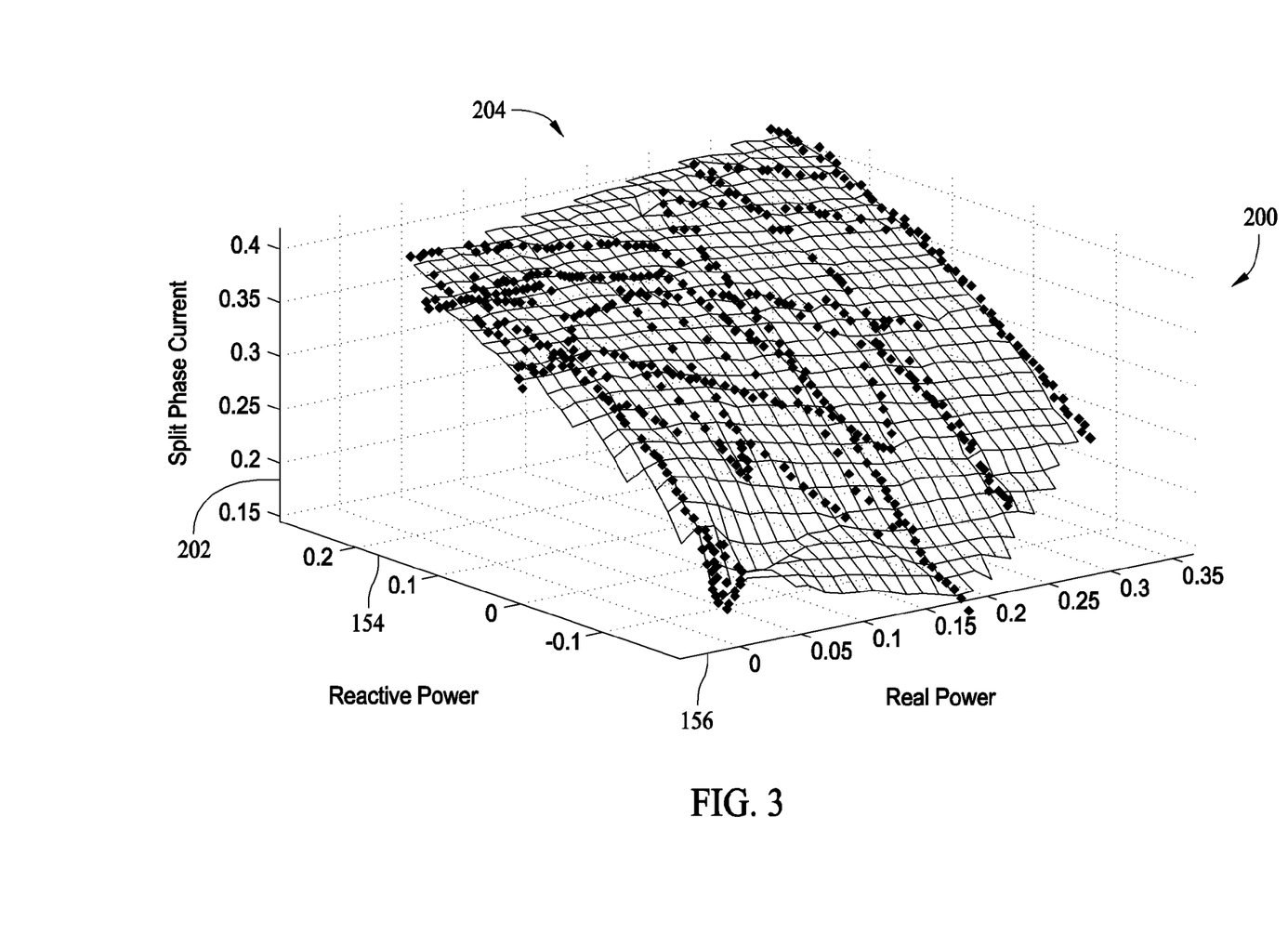
FIG. 3 is another graph representing the method executed by the system of FIG. 1.

FIG. 3 is a graph 200 representing a relationship between an expected value of a split-phase current or an expected split-phase current, generated by one of the first, second, and third phases, an active power P, and a reactive power Q output by the generator. Microprocessor-based relay 38 generates graph 200. Expected split-phase current is represented along an axis 202. Graph 200 includes a surface 204. In an alternative embodiment, instead of an expected split-phase current, microprocessor-based relay 38 generates a first complex ratio of a phasor between a current in coil 48 and a phasor of a current in coil 50. In an alternative embodiment, instead of an expected split-phase current, microprocessor-based relay 38 generates a second complex ratio between a current in coil 48 and a total current in coils 48 and 50. A phasor includes a complex number including a real part and an imaginary part. A phasor has a magnitude and an angle. The first and second complex ratios are functions of an active power P and a reactive power Q, and are used for inter-turn fault detection. In yet another alternative embodiment, instead of measuring and using a split-phase current on a per-phase basis, any linear combination of a plurality of split-phase currents of the first, second, and third phases is created and used. One such combination includes a neutral current, which is a sum of split-phase currents of the first, second, and third phases. The method for determining an occurrence of a short circuit applies to an application that effectively presents a natural unbalance in at least one of coils of the first, second, and third phases as a function of active power P and reactive power Q at terminals 54, 56, and 58 of the stator 12.

Microprocessor-based relay 38 extracts a magnitude and an angle of at least one of split-phase currents received via conductors 100, 102, and 104. For example, microprocessor-based relay 38 samples a split-phase current received via one of conductors 100, 102, and 104, filters the split-phase current digitally, and extracts a phasor of the split-phase current.

An angle of a split-phase current is useful when an inter-turn fault of stator 12 does not change a magnitude of the split-phase current, or alternatively changes the magnitude insignificantly. However, an angle of a split-phase current changes during some inter-turn fault of stator 12 allowing for reliable detection of the inter-turn fault within coils of one of the first, second, and third phases.

To use an angle of a split-phase current, microprocessor-based relay 38 establishes a consistent unambiguous phase reference, so that the angle makes the same sense at different points in time. Examples of the unambiguous phase reference include an angle of a positive sequence voltage, an angle of a positive sequence current, an angle of split-phase current of one of the first, second, and third phases, and an angle of a voltage of across one of the terminals 54, 56, and 58.

Figure 4:
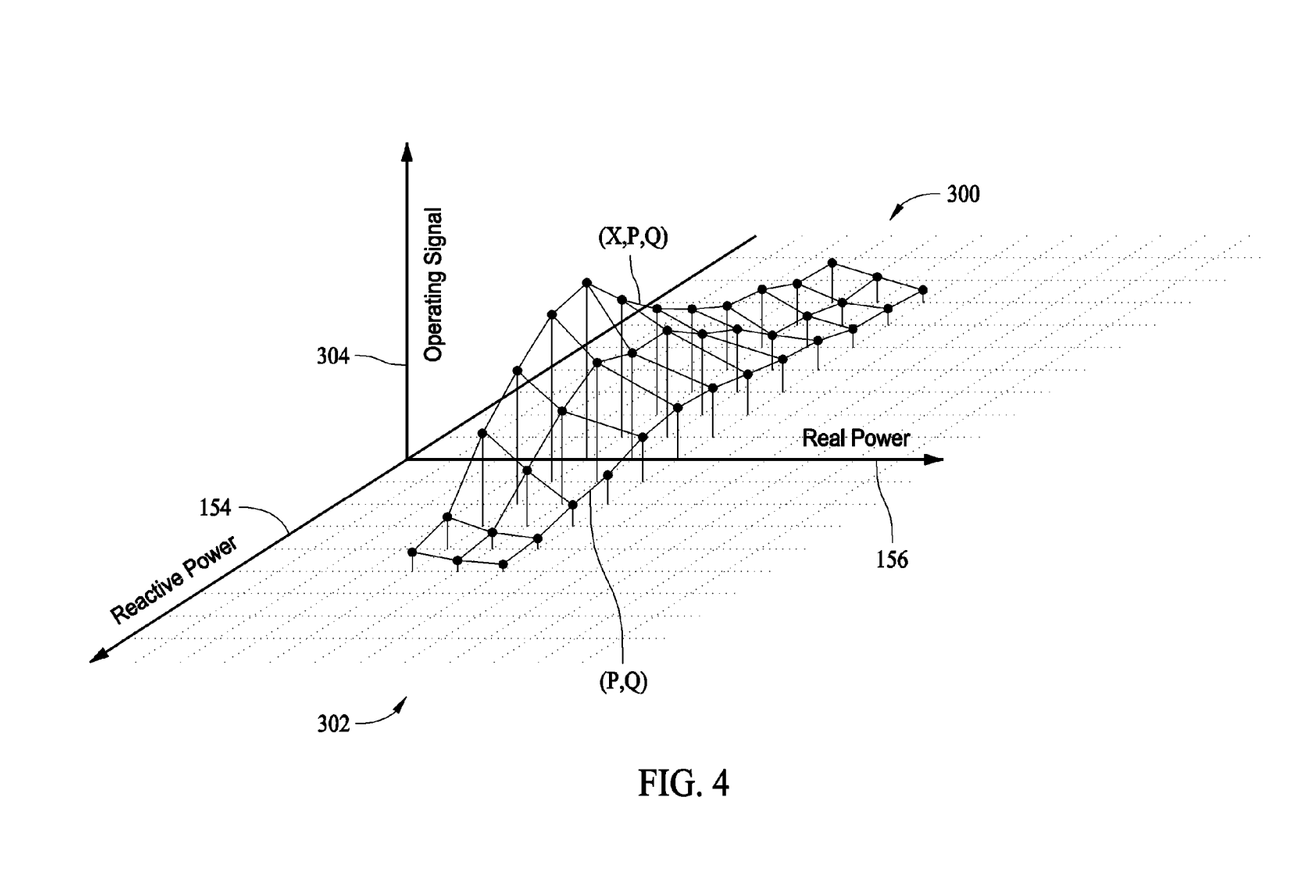
FIG. 4 is yet another graph representing the method executed by the system of FIG. 1.

Microprocessor-based relay 38 extracts a phasor of a split-phase current, calculates a difference between a measured split-phase current and an expected split-phase current, determines whether the difference exceeds a security margin, and determines an inter-turn fault of stator 12 if the difference exceeds the security margin. A measured split-phase current is also a measured value of a split-phase current. Microprocessor-based relay 38 generates alarm signal 94 and/or trip signal 96 upon determining an existence of inter-turn fault of stator 12. In an alternative embodiment, upon determining that the unambiguous phase reference is not available or alternatively is too low to establish a meaningful phase measurement, microprocessor-based relay 38 may be programmed to use a magnitude of a split-phase current and neglect the unreliable phase FIG. 4 is a graph 300 representing a relationship between an active power generated by the first, second, and third phases, a reactive power generated by the first, second, and third phases, and an operating parameter or point, such as, including, but not limited to, a magnitude of an nth harmonic, an angle of a split-phase current output by one of the first, second, and third phases, a magnitude of the split-phase current, and a phasor of the split-phase current. Graph 300 includes a measured operating point X represented along an axis 304. Graph 300 shows a grid 302 formed of co-ordinates of active power P and reactive power Q. Co-ordinates of grid 302 include $$i = 0 \ldots N_{max}, \text{and} \quad (1)$$

$$j = -M_{max} \ldots M_{max} \quad (2)$$

where $N_{max}$ is a positive real number and $M_{max}$ is a positive real number, i represents a range of axis 156, and j represents a range of axis 154. As an example, microprocessor-based relay 38 divides axis 156 into increments of 1, where $\Delta i = 1$, and divides axis 154 into increments of 2, where $\Delta j = 2$. An example of $\Delta i$ includes a real number ranging from and including 0.05 to 0.1, and an example of $\Delta j$ includes a real number ranging from and including 0.05 to 0.1. In one embodiment $\Delta i$ is equal to $\Delta j$. In an alternative embodiment, $\Delta i$ is unequal to $\Delta j$. Although i ranges from 0 to $N_{max}$, in an alternative embodiment, i ranges from $-N_{max}$ to $N_{max}$.

During a normal or alternatively an abnormal operation of the generator, microprocessor-based relay 38 generates an operating point represented as $$(X, P, Q) \quad (3)$$

where X is an operating point that represents one of a magnitude of an nth harmonic, an angle of a split-phase current output by one of the first, second, and third phases, a magnitude of the split-phase current, and a phasor of the split-phase current for each (P,Q) point. For example, microprocessor-based relay 38 generates the operating point (X,P,Q) by measuring an active power P, a reactive power Q, and at least one of a magnitude and a phase of a split-phase current received via one of conductors 100, 102, and 104. As yet another example, microprocessor-based relay 38 generates the operating point (X,P,Q) by calculating an active power P, a reactive power Q, and a magnitude of an nth harmonic of a voltage measured at terminal 62.

Microprocessor-based relay 38 calculates a plurality of co-ordinates of a point adjacent to (P,Q) by applying:

$$p = \text{floor}\left(\frac{P}{\Delta i}\right), \text{ and} \quad (4)$$

$$p = \text{floor}\left(\frac{Q}{\Delta j}\right) \quad (5)$$

where the floor operand rounds down to a nearest integer. For example, a floor of 25.8 is 25. As another example, a floor of −19.2 is −20.

Figure 5:
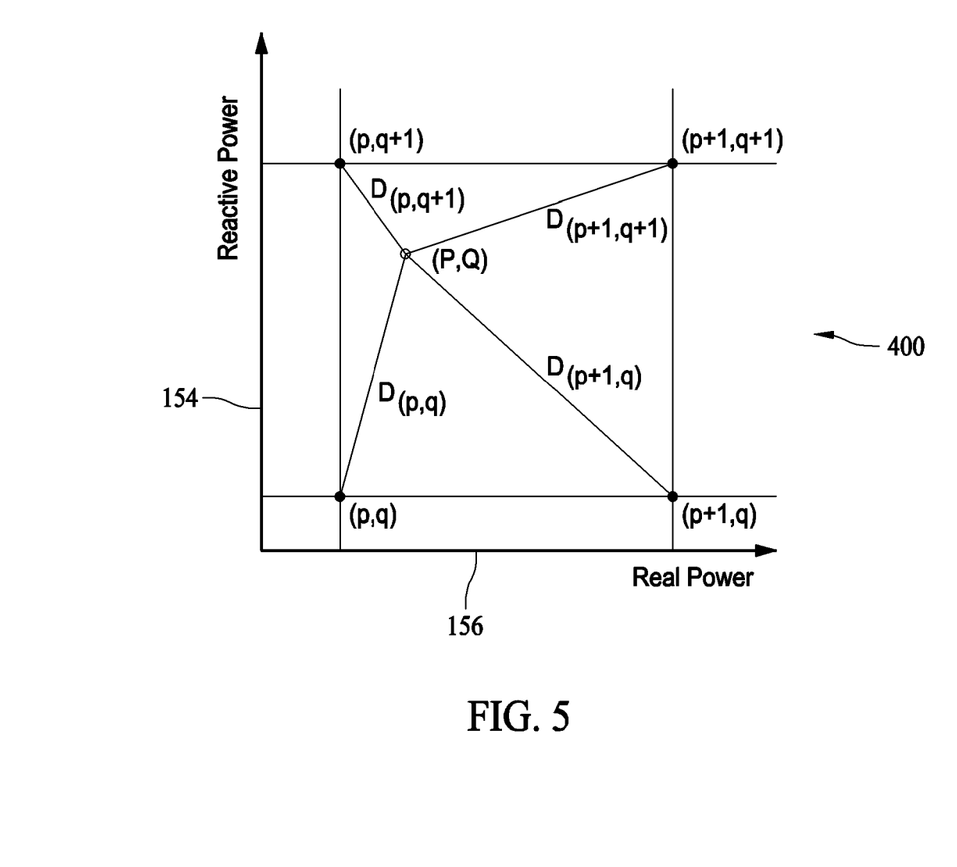
FIG. 5 is still another graph representing the method executed by the system of FIG. 1.

FIG. 5 is a graph 400 representing a relation between active power P and reactive power Q. The operating point (X,P,Q) is located between the following four vertices of grid 302:

$$(p,q), (p,q+1), (p+1,q+1), (p+1,q) \quad (6)$$

Microprocessor-based relay 38 applies the operating point X to adjust all the four vertices surrounding the point (P,Q). Microprocessor-based relay 38 generates $X_{(p,q)NEW}$ from X by applying $$X_{(p,q)NEW} = (1-\alpha) \cdot X_{(p,q)OLD} + \alpha \cdot X \quad (7)$$

where $X_{(p,q)OLD}$ is measured by microprocessor-based relay 38 at vertex (p,q) of active and reactive power. It is noted that in equation 7, microprocessor-based relay 38 measures $X_{(p,q)OLD}$ earlier in time before measuring X and measures $X_{(p,q)OLD}$ at point (p,q) on grid 302.

In addition to generating $X_{(p,q)NEW}$, microprocessor-based relay generates $X_{(p,q+1)NEW}$, $X_{(p+1,q+1)NEW}$, and $X_{(p+1,q)NEW}$ from X by applying $$X_{(p,q+1)NEW} = (1-\alpha) \cdot X_{(p,q+1)OLD} + \alpha \cdot X \tag{8}$$

$$X_{(p+1,q+1)NEW} = (1-\alpha) \cdot X_{(p+1,q+1)OLD} + \alpha \cdot X, \text{ and} \tag{9}$$

$$X_{(p+1,q)NEW} = (1-\alpha) \cdot X_{(p+1,q)OLD} + \alpha \cdot X \tag{10}$$

where $X_{(p,q+1)OLD}$ is measured by microprocessor-based relay 38 at vertex (p,q+1) of active and reactive power, $X_{(p+1,q+1)OLD}$ is measured by microprocessor-based relay 38 at vertex (p+1,q+1) of active and reactive power, and $X_{(p+1,q)OLD}$ is measured by microprocessor-based relay 38 at vertex (p+1,q) of active and reactive power. Microprocessor-based relay 38 measures each of $X_{(p,q+1)OLD}$, $X_{(p+1,q+1)OLD}$, and $X_{(p+1,q)OLD}$ earlier in time before measuring X. In equations 7–10, microprocessor-based relay 38 applies a smoothing filter α, ranging from and including 0.01 to 0.1, for security. A value of α controls a speed of learning. The higher the α, the faster the convergence of $X_{(p,q)NEW}$, $X_{(p,q+1)NEW}$, $X_{(p+1,q+1)NEW}$, and $X_{(p+1,q)NEW}$ to a specific value after each iteration of execution of equations 7–10. The user may adjust the smoothing filter to microprocessor-based relay 38 via a user interface, such as a keyboard or a mouse.

In an alternative embodiment, instead of applying equations 7–10, microprocessor-based relay 38 determines a plurality of distances between point (P,Q) and each of the four vertices by applying:

$$D_{(p,q)} = \frac{(p \cdot \Delta i - P)^2 + (q \cdot \Delta j - Q)^2}{2 \cdot \Delta i \cdot \Delta j}, \tag{11}$$

$$D_{(p,q+1)} = \frac{(p \cdot \Delta i - P)^2 + (q \cdot \Delta j + \Delta j - Q)^2}{2 \cdot \Delta i \cdot \Delta j}, \tag{12}$$

$$D_{(p+1,q+1)} = \frac{(p \cdot \Delta i + \Delta i - P)^2 + (q \cdot \Delta j + \Delta j - Q)^2}{2 \cdot \Delta i \cdot \Delta j}, \text{ and} \tag{13}$$

$$D_{(p+1,q)} = \frac{(p \cdot \Delta i + \Delta i - P)^2 + (q \cdot \Delta j - Q)^2}{2 \cdot \Delta i \cdot \Delta j} \tag{14}$$

where $D_{(p,q)}$ is a distance between (P,Q) and (p,q), $D_{(p,q+1)}$ is a distance between (P,Q) and (p,q+1), $D_{(p+1,q+1)}$ is a distance between (P,Q) and (p+1,q+1), and $D_{(p+1,q)}$ is a distance between (P,Q) and (p+1,q).

Microprocessor-based relay 38 determines $X_{(p,q)NEW}$ from $D_{(p,q)}$, $X_{(p,q+1)NEW}$ from $D_{(p,q+1)}$, $X_{(p+1,q+1)NEW}$ from $D_{(p+1,q+1)}$, and $X_{(p+1,q)NEW}$ from $D_{(p+1,q)}$ by applying:

$$X_{(p,q)NEW} = (1-\alpha \cdot (1-D_{(p,q)})) \cdot X_{(p,q)OLD} + \alpha \cdot (1-D_{(p,q)}) \cdot X, \tag{15}$$

$$X_{(p,q+1)NEW} = (1-\alpha \cdot (1-D_{(p,q+1)})) \cdot X_{(p,q+1)OLD} + \alpha \cdot (1-D_{(p,q+1)}) \cdot X, \tag{16}$$

$$X_{(p+1,q+1)NEW} = (1-\alpha \cdot (1-D_{(p+1,q+1)})) \cdot X_{(p+1,q+1)OLD} + \alpha \cdot (1-D_{(p+1,q+1)}) \cdot X, \tag{17}$$

$$X_{(p+1,q)NEW} = (1-\alpha \cdot (1-D_{(p+1,q)})) \cdot X_{(p+1,q)OLD} + \alpha \cdot (1-D_{(p+1,q)}) \cdot X \tag{18}$$

In equations 7–10 and 15–18, during each following iteration, microprocessor-based relay 38 substitutes a new value in place of an old value. For example, in a second iteration after microprocessor-based relay 38 generates $X_{(p,q)NEW}$ during a first iteration, microprocessor-based relay 38 substitutes $X_{(p,q)NEW}$ instead of $X_{(p,q)OLD}$ in equation (15), and calculates another newer value newer than $X_{(p,q)NEW}$. Equations 15–18 provide a smooth transition between training one set of point versus a different set of points on grid 302 as the operating point (X,P,Q) moves from one square on grid 302 to the adjacent one.

When forming surfaces 160 (FIG. 2) and 204 (FIG. 3), equations 7–10 and 15–18 provide a weighted average by means of exponential convergence to the specific value. The smoothing filter provides a weight. A check or validation is designed to decide if a value generated by applying either equations 7–10 or equations 15–18 learned in the process is final and can be trusted to be used by microprocessor-based relay 38 to generate at least one of alarm signal 90, alarm signal 94, trip signal 92, and trip signal 96. The check includes generating at least one a first flag $FLG_1$ and a second flag $FLG_2$.

Microprocessor generates the first flag $FLG_1$ upon determining that $$(|X_{(p,q)NEW} - X_{(p,q)OLD}| < \beta \cdot X_{(p,q)NEW}), \tag{19}$$

$$(|X_{(p,q+1)NEW} - X_{(p,q+1)OLD}| < \beta \cdot X_{(p,q+1)NEW}), \tag{20}$$

$$(|X_{(p+1,q+1)NEW} - X_{(p+1,q+1)OLD}| < \beta \cdot X_{(p+1,q+1)NEW}), \text{and/or} \tag{21}$$

$$(|X_{(p+1,q)NEW} - X_{(p+1,q)OLD}| < \beta \cdot X_{(p+1,q)NEW}), \tag{22}$$

where β is an arbitrary value, ranging from and including 0.01 to 0.5, expressing a percentage difference that identifies a steady state of each of $X_{(p,q)NEW}$, $X_{(p,q+1)NEW}$, $X_{(p+1,q+1)NEW}$, and $X_{(p+1,q)NEW}$ is being reached. The user may provide the arbitrary value β to microprocessor-based relay 38 via the user interface. Microprocessor-based relay 38 does not generate the first flag upon determining that all of equations 19–21 are not satisfied. By applying equation (19), microprocessor-based relay 38 checks if there is no change in a value of $X_{(p,q)NEW}$ as generated by either equation 7 or 15. Similarly, by applying equation (20), microprocessor-based relay 38 checks if there is no change in a value of $X_{(p,q+1)NEW}$ as generated by either equation 8 or 16. By applying an equation (21), microprocessor-based relay 38 checks if there is no change in a value of $X_{(p+1,q+1)NEW}$ as generated by either equation 9 or 17. By applying an equation (22), microprocessor-based relay 38 checks if there is no change in a value of $X_{(p+1,q)NEW}$ as generated by either equation 10 or 18.

Microprocessor-based relay 38 determines whether the first flag should be generated by applying equations 19–21 each time a point on grid 302 is updated. For example, upon generating the newer value, microprocessor-based relay 38 substitutes $X_{(p,q)NEW}$ in place of $X_{(p,q)OLD}$ in equation (19), and substitutes the newer value in place of $X_{(p,q)NEW}$ to determine whether to generate the first flag.

Microprocessor-based relay 38 generates the second flag upon determining that $$|X_{(p,q)} - X_{(p-1,q)}| < \delta \cdot X_{(p,q)}, \tag{23}$$

$$|X_{(p,q)} - X_{(p+1,q)}| < \delta \cdot X_{(p,q)}, \tag{24}$$

$$|X_{(p,q)} - X_{(p,q-1)}| < \delta \cdot X_{(p,q)}, \tag{25}$$

$$|X_{(p,q)} - X_{(p,q+1)}| < \delta \cdot X_{(p,q)} \tag{26}$$

where δ is an arbitrary factor, ranging from and including 0.01 to 0.5. Microprocessor-based relay 38 measures $X_{(p-1,q)}$ at point (p−1,q) on grid 302 and measures $X_{(p,q-1)}$ at point (p,q−1) on grid 302. Microprocessor-based relay 38 does not generate the second flag upon determining that any one of equations 23–26 is not satisfied. The user may provide the arbitrary factor 6 to microprocessor-based relay 38 via the user interface. Equations 23–26 do not apply if (P,Q) is on an outer border of grid 302 and has less than four neighboring vertices (p,q), (p,q+1), (p+1,q+1), and (p+1,q). In applying equations 23–26, microprocessor-based relay 38 checks if surfaces 160 (FIG. 2) and 204 (FIG. 3) that emerge in response to self-tuning are smooth. This is determined by checking differences between surrounding points on grid 302.

Accordingly, microprocessor-based relay 38 determines the operating point (X,P,Q) as recited in equation (3), calculates the vertices (p,q), (p,q+1), (p+1,q+1), and (p+1,q) from the operating point (X,P,Q), updates $X_{(p,q)OLD}$, $X_{(p,q+1)OLD}$, $X_{(p+1,q+1)OLD}$, and $X_{(p+1,q)OLD}$ surrounding the operating point (X,P,Q) by applying either equations 7–10 or equations 15–18, calculates the first flag for the updated operating points $X_{(p,q)NEW}$, $X_{(p,q+1)NEW}$, $X_{(p+1,q+1)NEW}$, and $X_{(p+1,q)NEW}$ by applying equations 19–22, calculates the second flag for the updated operating points by applying equations 23–26, and updates the first and second flags for each iteration of one of equations 7, 8, 9, 10, 15, 16, 17, and 18.

Upon determining that both the first and second flags are set or generated for all the four vertices surrounding the present operating point X, microprocessor-based relay 38 proceeds to determine if the operating point signifies a fault and should result in generating at least one of alarm signal 90, trip signal 92, alarm signal 94, and trip signal 96. The determination of whether an operating point signifies a fault starts with calculating an expected value of the operating point. One way of calculating an expected value is to apply a weighted average of a plurality of expected values of operating points at the four vertices surrounding the present point (P,Q). To do that microprocessor-based relay 38 generates a total distance D by applying $$D = D_{(p,q)} + D_{(p,q+1)} + D_{(p+1,q+1)} + D_{(p+1,q)} \qquad (27)$$

Microprocessor-based relay 38 generates an expected operating point $X_{EXPECTED}$ by applying $$X_{EXPECTED} = \frac{1}{D}(X_{(p,q)NEW} \cdot D_{(p,q)} + X_{(p,q+1)NEW} \cdot D_{(p,q+1)} + X_{(p+1,q+1)NEW} \cdot D_{(p+1,q+1)} + X_{(p+1,q)NEW} \cdot D_{(p+1,q)}) \qquad (28)$$

Microprocessor-based relay 38 generates at least one of alarm signal 90 and trip signal 92 upon determining that $$|V_n| < X_{EXPECTED} - \Omega \qquad (29)$$

where $V_n$ represents a measured magnitude of an nth harmonic or a measured nth harmonic, and $\Omega$ is a magnitude security margin ranging from and including 2 percent to 30 percent of $X_{EXPECTED}$. The user may provide the magnitude security margin to microprocessor-based relay 38 via the user interface. Microprocessor-based relay 38 generates at least one of alarm signal 94 and trip signal 96 upon determining that $$|I_{SP} - X_{EXPECTED}| > \Pi \qquad (30)$$

where $I_{SP}$ is a measured value of a split-phase current received from one of the first, second, and third phases, and $\Pi$ is a split-phase security margin ranging from and including 2 percent to 15 percent of $X_{EXPECTED}$. The user provides the split-phase security margin to microprocessor-based relay 38 via the user interface. In an alternative embodiment, at least one of the magnitude security margin and the split-phase security margin is expressed as a fixed value, such as ranging from and including 5 to 20, other than a percentage of $X_{EXPECTED}$. In another alternative embodiment, one of the magnitude security margin and the split-phase security margin is expressed as the fixed value and the remaining one of the magnitude security margin and the split-phase security margin is expressed as a percentage of $X_{EXPECTED}$.

Equation 30 is rewritten to:

$$|(I_{SP(RE)} + j \cdot I_{SP(IM)}) - (X_{EXPECTED(RE)} + j \cdot X_{EXPECTED(IM)})| > \Pi \qquad (31)$$

where $I_{SP(RE)}$ is a real part of a measured split-phase current $I_{SP}$, $I_{SP(IM)}$ is an imaginary part of the measured split-phase current $I_{SP}$, $X_{EXPECTED(RE)}$ is a real part of an expected operating point $X_{EXPECTED}$, and $X_{EXPECTED(IM)}$ is an imaginary part of the expected operating point $X_{EXPECTED}$. In an alternative embodiment, equation 31 may not include $I_{SP(RE)}$ and $X_{EXPECTED(RE)}$. In another alternative embodiment, equation 31 may not include $I_{SP(IM)}$ and $X_{EXPECTED(IM)}$. It is noted that in equations 19–26 and 29–31, $||$ represents a magnitude of a complex number. It is also noted that equations 1–31 are derived for two-dimensional situations including dependence of a single operating quantity, such as, a split-phase current or a magnitude of an nth harmonic, on two variables, such as P and Q, but can be easily extended onto generalized multi-dimensional cases.

Equations 29–31 present instantaneous and possibly definite-time delayed modes of operation. Other variants are possible too such as measuring a difference between actual and expected values by applying a short time delay in a resolution, such as disconnecting the generator from the energy source if either $X_{EXPECTED} - |V_n|$ or $|I_{SP} - X_{EXPECTED}|$ is large. For example, if $|I_{SP} - X_{EXPECTED}|$ is greater than $\Pi$ and is of a first value, a first time delay in applying the resolution is applied than applying a second time delay. The second time delay is greater than the first time delay and is applied when $|I_{SP} - X_{EXPECTED}| > \Pi$ and has a second value. The second value is less than the first value. Such inverse-time operating characteristics would bring extra security, but at the same time provide for faster operation in clear-cut cases.

Microprocessor-based relay 38 applies at least one of equations 29 and 31. For example, microprocessor-based relay 38 generates at least one of alarm signal 90 and trip signal 92 upon determining that a difference between an expected operating point $X_{EXPECTED}$ and a measured magnitude $|V_n|$ of an nth harmonic is greater than the magnitude security margin $\Omega$. As another example, microprocessor-based relay 38 generates at least one of alarm signal 94 and trip signal 96 upon determining that a difference between a measured split-phase current and an expected split-phase current is greater than the split-phase security margin $\Pi$.

Microprocessor-based relay 38 applies either equations 7–10 or 15–18 upon determining that the generator is operating normally. As an example, the generator operates normally when microprocessor-based relay 38 determines that currents in conductors 70, 72, and 74 are within a plurality of rated current ranges of the generator. The user provides the rated current ranges to microprocessor-based relay 38 via the user interface. As another example, the generator operates normally when microprocessor-based relay 38 determines that a voltage between terminal 52 and any one of terminals 54, 56, and 58 is within a rated voltage. The user provides the rated voltage to microprocessor-based relay 38 via the user interface. As yet another example, the generator operates normally when microprocessor-based relay 38 determines that a difference between currents in coils, such as coils 48 and 50 (FIG. 1), in one of the first, second, and third phases is minimal, such as ranging from and including 0 to 5%. As still another example, the generator operates normally when microprocessor-based relay 38 determines that a difference between a voltage across one of the first, second, and third phases, and a voltage across one of the remaining of the first, second, and third phases is minimum, such as from and including 0 to 5%. Otherwise, upon determining that the generator is not operating normally, microprocessor-based relay 38 does not apply equations 7–10 and 15–18.

It is noted that in an alternative embodiment, an active power P and a reactive power Q are substituted with equivalent dimensions, including but not limited to, one of a set of apparent power and power factor, a set of single-phase active and reactive power, a set of three-phase or single-phase voltage and current magnitudes and angles, a set of positive-sequence voltage and current magnitudes and angles, an apparent positive-sequence impedance, and a phase-to-phase apparent impedances.

The methods for determining an occurrence of a short-circuit are capable of not only self-tuning to a plurality of unique characteristics of the generator, but also of following a plurality of slowly drifting characteristics of the generator. This facilitates applications to monitoring and diagnostics, including predictive maintenance. As the generator changes due to an aging process or a progressing failure, an nth harmonic and a split-phase current generated by stator 12 may change. For example, a slowly evolving problem with a plurality of bearings may result in changes to a size of an air-gap between the stator 12 and a rotor of the generator. The changes to the size of the air-gap in turn slightly changes a flow of magnetic fields between the first, second, and third phases of stator 12, and result in changes to split-phase currents received via conductors 100, 102, and 104. The changes in the flow of the magnetic fields are detected microprocessor-based relay 38 when microprocessor-based relay 38 generates and stores a snapshot periodically, such as weekly or monthly, of an expected operating surface $X_{EXPECTED}$, and compares the snapshots over longer, such as every three or six months, periods of time. Microprocessor-based relay 38 stores the snapshots in a memory device, such as a random access memory or a read-only memory, located within microprocessor-based relay 38. Some changes in the snapshots are recognized by the user as natural, such as those caused by seasonal variations in temperature. Other changes in the snapshots cannot be correlated by the user to any known external factor, and thus could be used for diagnostics and monitoring. For example, a slow degradation in an isolation between coils, such as coils 48 and 50, of stator 12 reduces an amount of an nth harmonic generated by the generator. Before the isolation breaks down catastrophically, the isolation may lead to a significantly reduced value of an nth harmonic lasting long enough to be detected as a slow drift in an nth harmonic characteristic of stator 12.

The method for determining an occurrence of a short-circuit applies a significant amount of filtering. In course of the filtering, many measuring errors statistically cancel enhancing accuracy of an expected nth harmonic or alternatively an expected split-phase current. This opens an opportunity to detect very small changes with relatively high accuracy. In addition, by taking the snapshots, storing them in the memory device, and comparing the snapshots with each other over the longer periods of time, allows detecting trends that are particularly slow, as well as to filter out changes that are periodic such as related to seasonal variations.

By tracking such slow drifts in an expected nth harmonic or an expected split-phase current, the user is capable of detecting subtle degradation or changes within the generator before the changes lead to catastrophic failures and call upon protective relays to operate.

Technical effects of the systems and methods for determining an occurrence of a short-circuit include recognizing a variability in an nth harmonic with respect to the variables, such as an active and reactive power, of the generator, and identifying an expected nth harmonic in the process of self-tuning. When the self-tuning is over, the methods for determining an occurrence of a short-circuit identify a stator ground fault within stator 12 by sudden departures in a measured nth harmonic from an expected nth harmonic.

Other technical effects include providing a split-phase protection. The split-phase protection provided by the method for determining an occurrence of a short-circuit is based on monitoring a split-phase current, which includes a difference between currents in parallel coils, such as coils 48 and 50, of one of the first, second, and third phases. The difference signifies a circulating current within parallel coils of one of the first, second, and third phases. In order to provide for a sensitivity of protection, the difference in currents is measured via one of current instrument transformers 16, 18, and 20. Ideally, with no inter-turn fault present, a split-phase current is zero. In practice, a non-zero value is measured because of slightly different placement of coils of one of the first, second, and third phases within a magnetic circuit of stator 12, possible past repairs on the coils, and/or asymmetrical coupling with other phases of the generator.

Yet other technical effects of the systems and methods for detecting a short-circuit include recognizing a variability in a split-phase current with respect to the variables of the generator, and identifying an expected split-phase current in the self-tuning. When the self-tuning is over, the method for detecting a short-circuit recognizes an inter-turn fault by monitoring sudden departures in a measured split-phase current including at least one of a magnitude and angle from an expected split-phase current.

Other technical effects of the methods for determining an occurrence of a short-circuit includes reducing an engineering effort by self-tuning to a plurality of unique characteristics of any given generator. By automatically extracting complete characteristic of the generator, the methods for determining an occurrence of a short-circuit provide for maximum fault sensitivity without jeopardizing security of protection.

Yet other technical effects include monitoring slow drifts in a plurality of continuously extracted characteristics of the generator; and using features of such slow drifts as predictors of future problems.

While the invention has been described in terms of various specific embodiments, those skilled in the art will recognize that the invention can be practiced with modification within the spirit and scope of the claims.

What is claimed is:

1. A method for detecting stator ground faults in a generator, said method comprising:
   receiving a neutral voltage signal from a neutral point of a stator;
   receiving a plurality of terminal voltage and current signals from the stator;
   deriving a magnitude of a harmonic component from the neutral voltage signal;
   deriving a total complex power from the terminal voltage and current signals;
   calculating an expected value of the harmonic based on the complex power at a first time and a plurality of values of the complex power, wherein the values of the complex power are measured at times before the first time;
comparing the expected value and a measured value of the harmonic; and
issuing at least one of a display signal and a trip signal if a difference between the expected and measured values signifies a stator ground fault.

2. A method in accordance with claim 1 further comprising:
determining whether a generator including the stator operates normally;
upon determining that the generator is operating normally, updating the expected value corresponding to an active and reactive power point, based on a measured value of the harmonic;
upon determining that the generator is not operating normally, suspending the update for the active and reactive power point; and
validating the active and reactive power point by monitoring a plurality of changes in the expected value.

3. A method in accordance with claim 1 further comprising determining a stator ground fault based on a difference between the expected and measured values.

4. A method in accordance with claim 1 further comprising issuing at least one of an alarm signal and a trip signal if a difference between the expected and measured values signifies a stator ground fault, wherein a time to indicate the stator ground fault is dependent on a difference between the expected and measured values.

5. A method in accordance with claim 1 further comprising issuing at least one of an alarm signal and a trip signal if a difference between the expected and measured values signifies a stator ground fault, wherein an indication of the stator ground fault is generated by conditions including at least one of an overcurrent condition, an undervoltage condition, and an under-impedance condition.

6. A method in accordance with claim 1 further comprising measuring the harmonic by one of:
a process of sampling, digital filtering and magnitude estimation; and
applying a hardware circuitry including a stand-alone sensor.

7. A method in accordance with claim 1 wherein the harmonic comprises an nth harmonic, wherein n is a multiple of three.

8. A method in accordance with claim 1 further comprising:
detecting a plurality of values of the harmonic over a time period; and
comparing the values with each other.

9. A method in accordance with claim 1 wherein the expected value of the harmonic is represented in relation to one of a two-dimensional table and an analytical equation including an active and a reactive power.

10. A method for detecting stator ground faults in a generator, said method comprising:
receiving a neutral voltage signal from a neutral point of a stator;
receiving a plurality of terminal voltage and current signals from the stator;
deriving a magnitude of a harmonic component from the neutral voltage signal;
deriving a total complex power from the terminal voltage and current signals;
calculating an expected value of the harmonic based on the complex power at a first time and a plurality of values of the complex power, wherein the values of the complex power are measured at times before the first time;
comparing the expected value and a measured value of the harmonic; and
generating an indication of a stator ground fault from the comparison.

11. A method in accordance with claim 10 further comprising:
performing at least one of:
generating an alarm upon receiving the indication of the stator ground fault; and
deenergizing a generator including the stator upon receiving the indication of the stator ground fault.

12. A system for detecting stator ground faults in a generator, said system comprising:
a microprocessor-based relay configured to:
receive a neutral voltage signal from a neutral point of a stator;
receive a plurality of terminal voltage and current signals from the stator;
derive a magnitude of a harmonic component from the neutral voltage signal;
derive a total complex power from the terminal voltage and current signals;
calculate an expected value of the harmonic based on the complex power at a first time and a plurality of values of the complex power, wherein the values of the complex power are measured at times before the first time; and
compare the expected value and a measured value of the harmonic.

13. A system in accordance with claim 12 wherein said microprocessor-based relay configured to issue at least one of an alarm signal and a trip signal if a difference between the expected and measured values signifies a stator ground fault.

14. A system in accordance with claim 12 wherein said microprocessor-based relay configured to:
determine whether a generator including the stator operates normally;
upon determining that the generator is operating normally, update the expected value corresponding to an active and reactive power point, based on a measured value of the third harmonic;
upon determining that the generator is not operating normally, suspend the update for the active and reactive power point; and
validate the active and reactive power point by monitoring a plurality of changes in the expected value.

15. A system in accordance with claim 12 wherein said microprocessor-based relay configured to determine a stator ground fault based on a difference between the expected and measured values.

16. A system in accordance with claim 12 wherein the expected value of the harmonic is one of exported to and imported from an off-line data storage device.

* * * * *